(12) United States Patent
Suzuki

(10) Patent No.: US 11,893,344 B2
(45) Date of Patent: Feb. 6, 2024

(54) MORPHEME ANALYSIS LEARNING DEVICE, MORPHEME ANALYSIS DEVICE, METHOD, AND PROGRAM

(71) Applicant: NIPPON TELEGRAPH AND TELEPHONE CORPORATION, Tokyo (JP)

(72) Inventor: Jun Suzuki, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 775 days.

(21) Appl. No.: 16/970,890

(22) PCT Filed: Feb. 19, 2019

(86) PCT No.: PCT/JP2019/006046
§ 371 (c)(1),
(2) Date: Aug. 18, 2020

(87) PCT Pub. No.: WO2019/163752
PCT Pub. Date: Aug. 29, 2019

(65) Prior Publication Data
US 2020/0380207 A1 Dec. 3, 2020

(30) Foreign Application Priority Data
Feb. 20, 2018 (JP) .................... 2018-028303

(51) Int. Cl.
G06F 40/268 (2020.01)
G06N 20/00 (2019.01)
(Continued)

(52) U.S. Cl.
CPC ............ G06F 40/268 (2020.01); G06F 17/18 (2013.01); G06F 40/20 (2020.01); G06N 3/04 (2013.01); G06N 20/00 (2019.01)

(58) Field of Classification Search
CPC ......... G06F 40/268; G06F 17/18; G06N 3/04; G06N 20/00
See application file for complete search history.

(56) References Cited

U.S. PATENT DOCUMENTS

2018/0075351 A1* 3/2018 Iwakura ................ G06F 18/241

OTHER PUBLICATIONS

Kudo, Taku, et al., "Applying Conditional Random Fields to Japanese Morphological Analysis," Proceedings of the 2004 Conference on Empirical Methods in Natural Language Processing (EMNLP-2004), Jul. 25, 2004, pp. 230-237.
(Continued)

*Primary Examiner* — Anne L Thomas-Homescu

(57) ABSTRACT

It is possible to achieve high analysis accuracy on the whole irrespective of a coverage ratio of a morpheme dictionary. A morpheme prediction section 38 outputs a morpheme label string as a morphological analysis result of input text by inputting a resultant vector generated for each character by a vector combination section 36 into a series predictor and sequentially performing calculation. At this point, there is used the series predictor which is subjected to learning in advance such that a morpheme label string obtained by inputting a resultant vector in which a character vector and a morpheme information vector are combined and which is generated without being combined with the morpheme information vector with a specific probability into the series predictor and sequentially performing the calculation coincides with a morpheme label string of learning data.

20 Claims, 9 Drawing Sheets

(51) Int. Cl.
    *G06F 17/18*     (2006.01)
    *G06N 3/04*     (2023.01)
    *G06F 40/20*     (2020.01)

(56) References Cited

OTHER PUBLICATIONS

Chiu, Jason P. C., et al., "Named Entity Recognition with Bidirectional LSTM-CNNs" Transactions of the Association for Comutational Linguistics, vol. 4, pp. 357-370, 2016. Jul. 2016.

Keda, Hiroyuki, "The dictionary information and word distributed expression are incorporated," A collection of papers presented at the 23 Annual Meeting of the Society of Language Processing (Mar. 2017).

Nakagawa, Tetsuji, et al., "Morphological Analysis by Modified Learning Method," IPSJ SIG notes, vol. 2001, No. 112, 2001, pp. 1-8.

\* cited by examiner

Fig. 1

ORIGINAL INPUT TEXT

HONNJITSUGOGO13JIYORITSUUJYOUKOKKAIGAKAISAISARE, KONNKOKKAINOSAIJYUUYOUHOUANNTOICHIDUKERARERU xxx HOUANN ...

CHARACTER UNITS

HONN|JITSU|GO|GO|1|3|JI|YO|RI|TSUU|JYOU|KO|KKAI|GA|KAI|SAI|SA|RE|, |KONN|KO|KKAI|NO|SAI|JYUU|...

MORPHEME ANALYSIS LEARNING DEVICE, MORPHEME ANALYSIS DEVICE, METHOD, AND PROGRAM

CROSS-REFERENCE TO RELATED APPLICATIONS

This application is a U.S. 371 Application of International Patent Application No. PCT/JP2019/006046, filed on 19 Feb. 2019, which application claims priority to and the benefit of JP Application No. 2018-028303, filed on 20 Feb. 2018, the disclosures of which are hereby incorporated herein by reference in their entireties.

TECHNICAL FIELD

The present invention relates to a morphological analysis learning apparatus, a morphological analysis apparatus, a morphological analysis learning method, a morphological analysis method, and a program, and particularly relates to a morphological analysis learning apparatus, a morphological analysis apparatus, a morphological analysis learning method, a morphological analysis method, and program for performing morphological analysis of input text.

BACKGROUND ART

Natural language denotes language which is usually used by a human being such as Japanese or English. A technique for grammatically or semantically analyzing text described in natural language has high academic significance from the linguistic view point of understanding the history and the structure of the language. In addition, in recent years, various services which are provided by automatically analyzing text generated by a human being grammatically and semantically and using the result of the analysis have been available mainly on the web.

For example, services on a translation site, a reputation analysis site for a person or a product, and a summarization site for a specific event correspond to the above various services. In these services, electronic text generated by a human being is analyzed grammatically and semantically in a system, and actual services are provided by using the analysis. In that sense, a technique for analyzing natural language grammatically and semantically is a basic technique for these services, and occupies a very important position in the information processing field.

The analysis of natural language sounds simple but the analysis thereof includes analyses from surficial analysis such as word segmentation or part-of-speech estimation to higher analysis such as estimation of dependency between words or clauses. Examples of the analysis include "sentence segmentation" for estimating a sentence segment from text, "word segmentation" for estimating a word segment, part-of-speech assignment for estimating a part of speech of a word, and dependency analysis for estimating a relationship between words or clauses. These examples are shown in FIG. 7.

In the present invention, attention is focused particularly on morphological analysis of Japanese. The morphological analyzer of Japanese denotes processing which mainly includes all of morpheme segmentation, part-of-speech estimation, infection estimation, reading estimation, and basic form estimation. In conventional Japanese morphological analysis, as shown in FIG. 8, a method which solves a problem where morphemes registered in a morpheme dictionary are used as candidates and an optimum morpheme string to input text is selected can be said to be the most predominant analysis method at present (NPL 1).

CITATION LIST

Non Patent Literature

[NPL 1] Taku Kudo, Kaoru Yamamoto, Yuji Matsumoto, Applying Conditional Random Fields to Japanese Morpho-logical Analysis, Proceedings of the 2004 Conference on Empirical Methods in Natural Language Processing (EMNLP-2004), pp. 230-237 (2004).
[NPL 2] Chiu, Jason and Nichols, Eric, Named Entity Recognition with Bidirectional LSTM-CNNs, Transactions of the Association for Computational Linguistics, volume 4, pp. 357-370, (2016).

SUMMARY OF THE INVENTION

Technical Problem

As described above, the predominant method of the conventional Japanese morphological analysis is known as an extremely effective method in the case where text is constituted only by morphemes registered in the morpheme dictionary. On the other hand, in the case where the text includes many morphemes which are not registered in the morpheme dictionary, i.e., so-called unknown words, it is pointed out that excellent analysis results are not obtained in many cases. A character-unit analysis method which does not depend on the morpheme dictionary is proposed as an analysis method which is relatively well-prepared for unknown words. However, a tradeoff that analysis accuracy is relatively low for text having many words which are registered in the morpheme dictionary is present in general (see FIG. 9).

It is widely known that a ratio indicating whether or not the morpheme appearing in the text is registered in the dictionary (hereinafter referred to as a coverage ratio of the morpheme dictionary) significantly differs depending on target text to be analyzed. For example, in the case of text which is described according to relatively standard Japanese grammar such as a newspaper article, the coverage ratio of the morpheme dictionary is considerably high. On the other hand, in the case of an article generated by an ordinary end user such as a blog, many errors in writing, erroneous use, and many colloquial expressions are included in the article and the number of relatively improper expressions increases, and the coverage ratio of the morpheme dictionary is thereby reduced.

Thus, it is possible to estimate the rough level of the coverage ratio of the morpheme dictionary to some extent depending on a target to be analyzed. However, strictly speaking, the coverage ratio is unknown in most cases, and it is often the case that there is no way of knowing an author who writes the target to be analyzed or a situation in which the target to be analyzed is written.

The present invention has been made in view of the above circumstances, and an object thereof is to provide a morphological analysis learning apparatus, a morphological analysis apparatus, a morphological analysis learning method, a morphological analysis method, and a program capable of achieving high analysis accuracy on the whole irrespective of a coverage ratio of a morpheme dictionary.

Means for Solving the Problem

In order to achieve the above object, a morphological analysis learning apparatus according to the present invention is a morphological analysis learning apparatus including: a sampling section which acquires learning data which is a pair of input text for learning and a morpheme label string which is a morphological analysis result of the input text for learning; a division section which divides the input text for learning of the learning data into character units; a character vector acquisition section which acquires a character vector for each character of the input text for learning; a dictionary vector acquisition section which acquires, for each character substring of the input text for learning, morpheme information matching the character substring from a morpheme dictionary, and acquires a morpheme vector representing the acquired morpheme information; a vector combination section which generates a resultant vector in which the character vector and a morpheme information vector are combined for each character of the input text for learning, and generates the resultant vector without combining the morpheme information vector with a specific probability; and a parameter learning section which performs learning of a parameter of a series predictor which uses a coding unit for assigning a morpheme label to the resultant vector generated for each character by the vector combination section such that a morpheme label string obtained by causing the coding unit to perform input into the series predictor which receives an output of the immediately preceding coding unit as an input and sequentially performing calculation coincides with the morpheme label string of the learning data.

In addition, a morphological analysis learning method according to the present invention is a morphological analysis learning method including: causing a sampling section to acquire learning data which is a pair of input text for learning and a morpheme label string which is a morphological analysis result of the input text for learning; causing a division section to divide the input text for learning of the learning data into character units; causing a character vector acquisition section to acquire a character vector for each character of the input text for learning; causing a dictionary vector acquisition section to acquire, for each character substring of the input text for learning, morpheme information matching the character substring from a morpheme dictionary, and acquire a morpheme vector representing the acquired morpheme information; causing a vector combination section to generate a resultant vector in which the character vector and a morpheme information vector are combined for each character of the input text for learning, and generate the resultant vector without combining the morpheme information vector with a specific probability; and causing a parameter learning section to perform learning of a parameter of a series predictor which uses a coding unit for assigning a morpheme label to the resultant vector generated for each character by the vector combination section such that a morpheme label string obtained by causing the coding unit to perform input into the series predictor which receives an output of the immediately preceding coding unit as an input and sequentially performing calculation coincides with the morpheme label string of the learning data.

Further, a morphological analysis apparatus according to the present invention is a morphological analysis apparatus including: a division section which divides input text into character units; a character vector acquisition section which acquires a character vector for each character; a dictionary vector acquisition section which acquires, for each character substring, morpheme information matching the character substring from a morpheme dictionary, and acquires a morpheme vector representing the acquired morpheme information; a vector combination section which generates a resultant vector in which the character vector and a morpheme information vector are combined for each character; and a morpheme prediction section which serves as a series predictor which uses a coding unit for assigning a morpheme label to the resultant vector generated for each character by the vector combination section, and outputs a morpheme label string as a morphological analysis result of the input text by causing the coding unit to perform input into the series predictor which receives an output of the immediately preceding coding unit as an input and sequentially performing calculation, wherein the series predictor is subjected to learning in advance such that a morpheme label string obtained by inputting the resultant vector in which the character vector and the morpheme information vector are combined and which is generated without being combined with the morpheme information vector with a specific probability into the series predictor and sequentially performing the calculation for each character of input text for learning of learning data which is a pair of the input text for learning and a morpheme label string which is a morphological analysis result of the input text for learning coincides with the morpheme label string of the learning data.

A morphological analysis method according to the present invention is a morphological analysis method including: causing a division section to divide input text into character units; causing a character vector acquisition section to acquire a character vector for each character; causing a dictionary vector acquisition section to acquire, for each character substring, morpheme information matching the character substring from a morpheme dictionary, and acquire a morpheme vector representing the acquired morpheme information; causing a vector combination section to generate a resultant vector in which the character vector and a morpheme information vector are combined for each character; and causing a morpheme prediction section serving as a series predictor which uses a coding unit for assigning a morpheme label to the resultant vector generated for each character by the vector combination section to output a morpheme label string as a morphological analysis result of the input text by causing the coding unit to perform input into the series predictor which receives an output of the immediately preceding coding unit as an input and sequentially performing calculation, wherein the series predictor is subjected to learning in advance such that a morpheme label string obtained by inputting the resultant vector in which the character vector and the morpheme information vector are combined and which is generated without being combined with the morpheme information vector with a specific probability into the series predictor and sequentially performing the calculation for each character of input text for learning of learning data which is a pair of the input text for learning and a morpheme label string which is a morphological analysis result of the input text for learning coincides with the morpheme label string of the learning data.

In addition, a program according to the present invention is a program for causing a computer to function as individual sections of the above-described morphological analysis learning apparatus or the above-described morphological analysis apparatus.

Effects of the Invention

According to the morphological analysis learning apparatus, the morphological analysis learning method, and the program of the present invention, by performing the learning of the parameter of the series predictor such that the morpheme label string obtained by inputting the resultant vector in which the character vector and the morpheme information vector are combined and which is generated without being combined with the morpheme information vector with the specific probability into the series predictor and sequentially performing the calculation coincides with the morpheme label string of the learning data, there is achieved an effect that it is possible to perform learning of the series predictor capable of achieving the high analysis accuracy on the whole irrespective of the coverage ratio of the morpheme dictionary.

In addition, according to the morphological analysis apparatus, the morphological analysis method, and the program of the present invention, by using the series predictor subjected to the learning in advance such that the morpheme label string obtained by inputting the resultant vector in which the character vector and the morpheme information vector are combined and which is generated without being combined with the morpheme information vector with the specific probability into the series predictor and sequentially performing the calculation coincides with the morpheme label string of the learning data, there is achieved an effect that it is possible to achieve the high analysis accuracy on the whole irrespective of the coverage ratio of the morpheme dictionary.

BRIEF DESCRIPTION OF DRAWINGS

FIG. 1 is a view showing examples of input text and character units.

DESCRIPTION OF EMBODIMENTS

Figure 2:
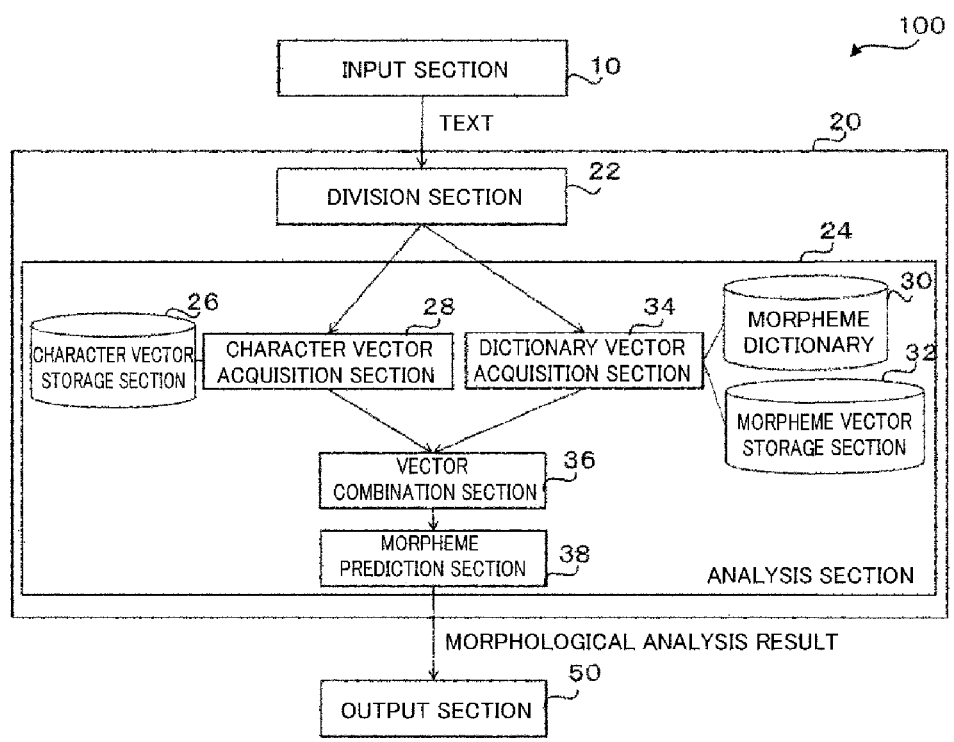
FIG. 2 is a block diagram showing the configuration of a morphological analysis apparatus according to an embodiment of the present invention.

Hereinbelow, an embodiment of the present invention will be described in detail with reference to the drawings.

Outline of Embodiment of Present Invention

First, an outline in the embodiment of the present invention will be described.

In the embodiment of the present invention, a series label predictor based on a neural net is used as a morphological analyzer serving as a base (NPL 2). In addition, morpheme information registered in a morpheme dictionary is utilized as a feature amount of the series label predictor based on the neural net. With this, in a situation in which a coverage ratio of the morpheme dictionary is relatively high, it becomes possible to achieve analysis accuracy equal to that in a convention method.

However, only with this arrangement, the analysis accuracy is degraded for data having the relatively low coverage ratio of the morpheme dictionary. This is because learning is performed by using information of the morpheme dictionary during the learning, and hence text which does not have dictionary information becomes deficient in information.

In order to solve this situation, in the embodiment of the present invention, by performing learning using learning data in which the dictionary information in the learning data is partially or completely concealed with a specific probability, a situation in the case where the coverage ratio of the morpheme dictionary is high and a situation in the case where the coverage ratio of the morpheme dictionary is low are artificially created, and learning of the morphological analyzer is performed.

The detail of a processing method will be described below.

Principle of Embodiment of Present Invention

A morphological analysis system is processing for receiving input text, dividing the input text into morpheme units which are defined in advance, and assigning a part of speech, an infection, a reading, and a basic form to the morpheme. Herein, the embodiment of the present invention will be described by using, as an example, the morphological analysis system which uses a series predictor (NPL 2) based on the neural net as a basic methodology.

[Processing Procedure of Morphological Analysis]

A procedure of processing for providing input text with morphemes can be roughly described as follow.

As an input, Japanese text is received.

Processing 1: Input text is divided into character units.

Processing 2: A vector allocated to each character is acquired and a list of vectors for the input text is produced.

Processing 3: Matching of an entry of a morpheme dictionary is performed on all character substrings of the input text, and a list of vectors corresponding to entries which have matched the individual character substrings is produced.

Processing 4: The lists of the vectors produced in Processing 2 and Processing 3 described above are input, and a list of resultant vectors is generated.

Processing 5: The list of the vectors produced in Processing 4 described above is input, predetermined calculation processing of the series predictor is performed, and a prediction result of a morpheme label string for the input text is generated.

The morpheme label string generated by the series predictor is output.

<Input>

An input into a system related to the embodiment of the present invention is Japanese text described in natural language. Herein, a description will be made on the assumption that mainly news articles or blog articles are input.

<Processing 1>

The input text is divided into character units. The division into character units is an extremely easy method for electronic text.

For example, as can be easily inferred from the fact that a text editor or a browser can display text, a conversion table for converting information expressed in the form of a byte string in a computer to characters can uniquely convert the information using a character code. Herein, for example, suppose that text described based on Unicode is input. However, processing required in the embodiment of the present invention does not depend on the type of the character code, and hence any character code may be used.

In Unicode, it is possible to uniquely read character segments from the byte string (see FIG. 1).

Herein, let c be a symbol representing a character. In addition, C represents a character set. That is, $c \in C$ is satisfied. Next, let I be the number of characters of input text. Let i be a variable from 1 to I, and $c_i$ represents the character string of the i-th processing unit. Therefore, the input text can be expressed as a list $(c_i)^I_{i=1} = (c_i, \ldots, c_I)$ of the character strings of the processing units.

The output in the present processing is a list $(c_i)^I_{i=1}$ of characters obtained by dividing the input text into character units.

<Processing 2>

Processing for receiving the list $(c_i)^I_{i=1}$ in which the input text is divided into character units and acquiring a character vector corresponding to each character is performed.

First, $$E$$

is a parameter of a neural network subjected to learning in advance, and $$E$$

denotes a D×N matrix. D is any natural number, and N is the number of elements in the character set C. As processing performed herein, the character vector corresponding to each character $c_i$ in the input text is acquired. Suppose that the corresponding character vector is predetermined according to the type of the character $c_i$. For example, suppose that the i-th character $c_i$ in the input text is the n-th character in the character set C.

In this case, processing in which a vector corresponding to the n-th column in the matrix $$E$$

is allocated to $c_i$ as $e_i$ is performed. This processing can be mathematically written as follows.

[Formula 1]

$$e_i \leftarrow E x_i \qquad (1)$$

Note that, in accordance with a number n in a vocabulary of $c_i$, let $x_i$ be a vector in which the n-th element is 1 and each of the other elements is 0.

This is performed on each character, and hence a list of the character vectors serving as the output of Processing 2 can be written as $(e_i)^I_{i=1} = (e_i, \ldots, e_I)$. Herein, in the case where $c_i$ and $c_j$ are the same character, $e_i = e_j$ is satisfied.

The final output of Processing 2 is the list $(e_i)^I_{i=1}$ of the acquired character vectors.

<Processing 3>

The input text $(c_i)^I_{i=1}$ which is divided into character units in Processing 1 is received, and the morpheme matching the character substring of the input text is extracted from the morpheme dictionary.

First, let T be the morpheme dictionary. S represents the number of entries of the morpheme dictionary. $t_s$ represents the s-th entry. $t \in T$ is satisfied for every s. Note that s is an integer from 1 to S.

For example, suppose that a given dictionary entry $t_s$ is constituted by a character string $(t_{s,1}, \ldots, t_{s,n})$. At this point, a given character substring $(c_i, \ldots, c_j)$ in the character string $(c_i)^I_{i=1}$ of the input text completely coincides with $(t_{s,1}, \ldots, t_{s,n})$, it is determined that the entry $t_s$ matches the character substring $(c_i, \ldots, c_j)$.

Next, let z be an S-dimensional vector. With regard to elements in z, an element which coincides with a number in the morpheme dictionary of the matching dictionary entry is 1, and each of the other elements is 0. Next, $$F$$

is a parameter of the neural network subjected to learning in advance, and $$F$$

denotes a D×S matrix constituted by the vector corresponding to each entry of the morpheme dictionary.

At this point, as morpheme dictionary information of the i-th character in the input text, a morpheme vector is acquired by the following formula.

[Formula 2]

$$f_i \leftarrow F z_i \qquad (2)$$

That is, $f_i$ is a D-dimensional vector, and corresponds to a vector to which all entries of the morpheme dictionary which match the i-th character are added.

The final output of Processing 3 is a list $(f_i)^I_{i=1}$ of the acquired morpheme vectors.

<Processing 4>

The list $(e_i)^I_{i=1}$ of the character vectors which is the final output of Processing 2, and the list $(f_i)^I_{i=1}$ of the morpheme vectors which is the final output of Processing 3 are combined. In the combination, the following calculation is performed on the position i of each character.

[Formula 3]

$$g_i \leftarrow G(e_i + p f_i) \forall i \in \{1, \ldots, I\} \qquad (3)$$

At this point, $$G$$

is a parameter of the neural network subjected to learning in advance, and a resultant vector $g_i$ in which character information and the dictionary information are combined is generated.

$$G$$

denotes an H×D-dimensional conversion matrix, and H is any natural number. In addition, let p be a variable having 0 or 1. As a method of determining the value of p, a value of 0 or 1 is stochastically allocated during learning. On the other hand, at the time of evaluation in which morphological analysis is actually performed, a value of 1 is always allocated. The stochastic allocation of the value of p during learning will be described in the description of learning processing.

The final output of Processing 4 is a list $(g_i)^I_{i=1}$ of the acquired resultant vectors.

<Processing 5>

Next, by using the list $(g_i)^I_{i=1}$ of the resultant vectors acquired in Processing 4 as an input, calculation is performed according to a predetermined calculation procedure of the series predictor. Many types of the configurations of the actually used series predictor are available. Herein, an example in the case where an LSTM (Long Short Term Memory) which is often used as the series predictor is used will be described. $g_i$ is the input of the i-th character position, and $h_{i-1}$ is the state of the LSTM at the immediately preceding time. Note that a zero vector is allocated when i=0 is satisfied. That is, $h_0=0$ is satisfied.

Let $W_1$, $W_2$, $W_3$, $W_4$, $V_1$, $V_2$, $V_3$, and $V_4$ be H× matrices, and let $b_1$, $b_2$, $b_3$, and $b_4$ be H-dimensional vectors. These are supposed to be parameters used in the LSTM. At this point, the LSTM performs the following calculation.

[Formula 4]

$$\begin{aligned}
c_i &\leftarrow u \odot i + f \odot c_{i-1} \\
u &= \sigma_2(W_1 g_i + V_1 h_{i-1} + b_1) \\
i &= \sigma_1(W_2 g_i + V_2 h_{i-1} + b_2) \\
f &= \sigma_1(W_3 g_i + V_3 h_{i-1} + b_3) \\
h_i &\leftarrow q \odot \sigma_2(c_i) \\
q &= \sigma_1(W_4 g_i + V_4 h_{i-1} + b_4)
\end{aligned} \quad (4)$$

Finally, $h_i$ is the output of the i-th processing.

Herein, let $\sigma_1(x)$ be a function for performing processing in which a vector x is received as an input, a sigmoid function $$\frac{1}{1+\exp(-ax_i)}$$

is calculated for each element $x_i$ of the input vector x, and the vector is returned as a new vector. Similarly, let $\sigma_2(\bullet)$ be a function for performing processing in which a tan h function $$\frac{2}{1+\exp(-2ax)} - 1$$

is calculated for each element x of the input vector, and the vector is returned as a new vector. In the embodiment of the present invention, a coding unit may be basically any coding unit as long as the coding unit has $g_i$ and $h_{i-1}$ as inputs, and its output can be written in the form of $h_i$. With this processing, a list of $h_i$ related to all processing units i is acquired. That is, $(h_i)^I_{i=1}=(h_1, \ldots, h_I)$ is satisfied. By using the list of the vectors, a label which is to be assigned to each character is predicted. First, Y represents a set of morpheme labels to be assigned to the individual characters. In addition, let M be the number of elements of the morpheme label set. For reference, let m be a variable representing the number of the morpheme label, and let $y_m$ be the m-th morpheme label.

Next, let $\hat{y}_i$ be the morpheme label for the i-th character. $\hat{y}_i \in Y$ is satisfied for each i.

At this point, let $o_{i,m}$ be a score for selecting the m-th morpheme label of the morpheme dictionary T as the output corresponding to the i-th character from the head of the input text. For the sake of simplicity, let o be scores of all labels from the first label to the M-th label in the morpheme label Y which are arranged and expressed by vector notation for the i-th character of the input text.

That is,

[Formula 5]

$$o_i = (o_{i,1}, \ldots, o_{i,M}) \quad (5)$$

is satisfied.

Next, a calculation method of $o_i$ is as follows.

[Formula 6]

$$o_i \leftarrow W^{(o)} h_i + b^{(o)} \quad (6)$$

wherein $W^{(o)}$ is a parameter of the neural network which is subjected to learning in advance and denotes an M×H matrix, and $b^{(o)}$ is a parameter of the neural network which is subjected to learning in advance and denotes an M-dimensional vector.

Finally, in processing for selecting the morpheme label of the i-th processing unit, the following formula is calculated.

[Formula 7]

$$\hat{y}_i \leftarrow \underset{m}{\mathrm{argmax}}\{\sigma_2(o_{i,m})\} \quad (7)$$

This formula corresponds to processing for selecting the morpheme label corresponding to the element number m having the highest value.

<Output>

A morpheme label string obtained by repeatedly arranging the processing for outputting $\hat{y}_i$ from i=1 to i=I according to Formula (7) serves as a morphological analysis result.

[Parameter Learning Processing of Series Predictor]

As described above, each constituent element of the morphological analysis herein is the neural network, and hence the parameter of each neural network is determined according to a machine learning method by using data for learning. Herein, D represents learning data. In addition, each learning data is constituted by a pair (X,Y) of input text X and the corresponding morpheme label string Y. That is, for example, in the case where N pieces of learning data are present, it is possible to describe the case as $D=\{(X_n,Y_n)\}^N_{n-1}$. In this case, $(X_n,Y_n)$ represents the n-th data in the learning data.

As a general form, the parameter in a character-based morphological analysis system which uses the neural network is determined as a solution of the following minimization problem of an objective function.

[Formula 8]

$$\hat{W} = \underset{W}{\mathrm{argmin}}\{L(W, \mathcal{D})\} \quad (8)$$

wherein W is a symbol representing a set of all parameters, and $\hat{W}$ is a symbol representing a set of optimum parameters obtained as a result of optimization. In addition, in general, L is referred to as a loss function, and has W and D as variables. That is, learning of the parameter W is processing in which W is updated such that the value of the loss function L is made as low as possible.

First, in the case where a model corresponding to the conventional method proposed in NPL 2 is used, the following loss function is used.

[Formula 9]

$$L(W, \mathcal{D}) = -\sum_{(X,Y)\in\mathcal{D}} \log(P(Y|X, W)) \quad (9)$$

$$= -\sum_{(X,Y)\in\mathcal{D}} \sum_i \log(P(y_i|X, W)) \quad (10)$$

wherein $y_i$ is the i-th morpheme label of a morpheme label string Y which is a correct solution, and $P(y_i|X,W)$ is the probability that $y_i$ which is the correct solution is estimated as $\hat{y}_i$ when the input text X is provided with the current parameter W.

In contrast, in the embodiment of the present invention, learning of the series predictor is performed such that a loss indicated by the following formula is reduced by also using learning data in which the morpheme dictionary information is partially concealed.

[Formula 10]

$$L(W, \mathcal{D}) = -\sum_{(X,Y)\in\mathcal{D}} \sum_i \log(P(y_i \mid X, p, W)) \quad (11)$$

wherein p corresponds to p described in Processing 4. Various cases can be conceived in determination of p and, herein, consideration is given to the case where p is determined randomly by using random numbers.

[Formula 11]

$$p=\text{Rand}(0,1) \quad (12)$$

wherein Rand(0,1) is a function which outputs 0 or 1 with equal probabilities.

In addition, it is also possible to use a method in which p is prepared in advance as learning data without using the random numbers. At this point, the learning of the series predictor is performed such that a loss indicated by the following formula is reduced.

[Formula 12]

$$L(W, \mathcal{D}) = -\sum_{(X,Y)\in\mathcal{D}} \sum_i \log(P(y_i \mid X, p = 1, W)) - \quad (13)$$
$$\sum_{(X,Y)\in\mathcal{D}} \sum_i \log(P(y_i \mid X, p = 0, W))$$

This case means that the learning is performed by equally using the case where the morpheme dictionary information is used as the learning data and the case where the morpheme dictionary information is not used as the learning data.

Specific parameter learning processing is as follows.

1. One piece of data (X,Y) is selected from the learning data D.
2. The loss indicated by Formula (11) is calculated by using the selected data (X,Y).
3. W is updated such that the value of the loss of Formula (11) is reduced.
4. The processing is ended when an end condition which is defined in advance is satisfied, and the processing returns to 1 when the end condition is not satisfied.

Various methods can be used for the processing in 3 and, as the simplest method, a method based on a gradient method in which a gradient with respect to a parameter is calculated and the parameter is minutely updated in the direction of the gradient may be used. In addition, with regard to the end condition in 4, the processing may be ended when the total amount of an update change amount of a parameter becomes equal to or lower than a specific value ε and, otherwise, the calculation may be repeated.

A parameter $\hat{W}$ which is finally obtained is fixed, and is used in the generation processing of the summary described above.

<Configuration of Morphological Analysis Apparatus According to Embodiment of Present Invention>

Next, a description will be given of the configuration of a morphological analysis apparatus according to the embodiment of the present invention. As shown in FIG. 2, a morphological analysis apparatus 100 according to the embodiment of the present invention can be constituted by a computer including a CPU, a RAM, and a ROM which stores programs and various pieces of data for executing a morphological analysis processing routine described later. As shown in FIG. 2, the morphological analysis apparatus 100 includes an input section 10, a computation section 20, and an output section 50 as its function.

The input section 10 receives input text on which morphological analysis is to be performed.

The computation section 20 includes a division section 22 and an analysis section 24.

The division section 22 divides the input text into character units.

The analysis section 24 includes a character vector storage section 26, a character vector acquisition section 28, a morpheme dictionary 30, a morpheme vector storage section 32, a dictionary vector acquisition section 34, a vector combination section 36, and a morpheme prediction section 38.

The character vector storage section 26 stores the character vector for each character.

The character vector acquisition section 28 acquires the character vector from the character vector storage section 26 for each character of the input text, and outputs the list of the character vectors.

The morpheme dictionary 30 stores the morpheme information for each morpheme.

The morpheme vector storage section 32 stores the morpheme vector for each morpheme.

The dictionary vector acquisition section 34 acquires, for each character substring of the input text, the entry of the morpheme information matching the character substring from the morpheme dictionary 30, and acquires the vector representing the morpheme information corresponding to the acquired entry from the morpheme vector storage section 32. In addition, the dictionary vector acquisition section 34 determines, for each character of the input text, the morpheme vector to which the vector corresponding to the entry of the morpheme information matching the character substring including the character is added, and outputs the list of the morpheme vectors.

The vector combination section 36 generates, for each character of the input text, the resultant vector in which the character vector and the morpheme information vector are combined according to Formula (3) described above, and outputs the list of the resultant vectors.

The morpheme prediction section 38 is the series predictor which uses the coding unit for assigning the morpheme label to the resultant vector generated for each character by the vector combination section 36. In addition, the morpheme prediction section 38 outputs the morpheme label string as the morphological analysis result of the input text from the output section 50 by causing the coding unit to perform input into the series predictor which receives the output of the immediately preceding coding unit as the input, sequentially performing the calculation according to Formula (4) described above, and sequentially selecting the morpheme label according to Formula (7) described above.

The parameter of the series predictor used in the morpheme prediction section 38 is subjected to learning by a morphological analysis learning apparatus 150 described later.

<Configuration of Morphological Analysis Learning Apparatus According to Embodiment of Present Invention>

Figure 3:
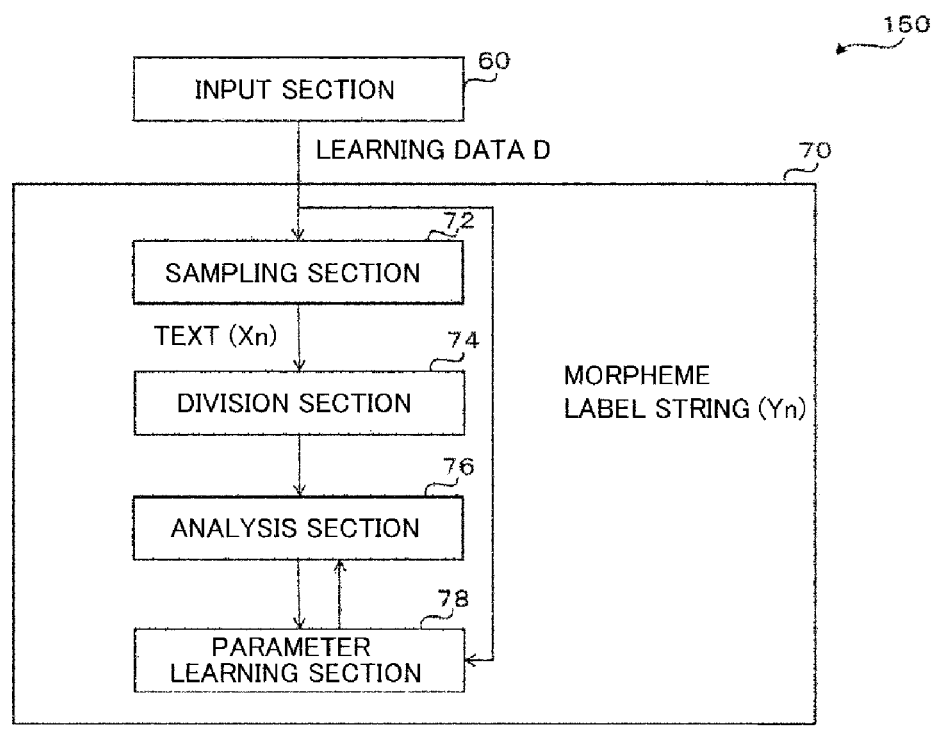
FIG. 3 is a block diagram showing the configuration of a morphological analysis learning apparatus according to the embodiment of the present invention.

Next, a description will be given of the configuration of a morphological analysis learning apparatus according to the embodiment of the present invention. As shown in FIG. 3, the morphological analysis learning apparatus 150 according to the embodiment of the present invention can be constituted by a computer including a CPU, a RAM, and a ROM which stores programs and various pieces of data for executing a morphological analysis learning processing routine described later. As shown in FIG. 3, the morphological analysis learning apparatus 150 includes an input section 60 and a computation section 70 as its function.

The input section 60 receives N pieces of the learning data each of which is a pair of input text for learning and the morpheme label string which is the morphological analysis result of the input text for learning.

The computation section 70 includes a sampling section 72, a division section 74, an analysis section 76, and a parameter learning section 78.

The sampling section 72 acquires one piece of the learning data from N pieces of the learning data received from the input section 60.

The division section 74 divides the input text for learning of the learning data acquired by the sampling section 72 into character units.

Similarly to the analysis section 24 of the morphological analysis apparatus 100, the analysis section 76 includes a character vector storage section, a character vector acquisition section, a morpheme dictionary, a morpheme vector storage section, a dictionary vector acquisition section, a vector combination section, and a morpheme prediction section.

That is, the character vector acquisition section acquires the character vector from the character vector storage section for each character of the input text for learning, and outputs the list of the character vectors.

In addition, the dictionary vector acquisition section acquires, for each character substring of the input text for learning, the entry of the morpheme information matching the character substring from the morpheme dictionary, and acquires the vector representing the morpheme information corresponding to the acquired entry from the morpheme vector storage section. Further, the dictionary vector acquisition section determines, for each character of the input text for learning, the morpheme vector to which the vector corresponding to the entry of the morpheme information matching the character substring including the character is added, and outputs the list of the morpheme vectors.

In addition, the vector combination section generates, for each character of the input text for learning, the resultant vector in which the character vector and the morpheme information vector are combined according to Formula (3) described above, and outputs the list of the resultant vectors.

At this point, the vector combination section determines p according to Formula (12) described above to randomly determine whether the resultant vector in which the character vector and the morpheme information vector are combined is generated or the resultant vector is generated without being combined with the morpheme information vector, and generates the resultant vector.

Alternatively, the vector combination section generates the resultant vector such that the case where the resultant vector in which the character vector and the morpheme information vector are combined is generated and the case where the resultant vector is generated without being combined with the morpheme information vector are equally used.

The morpheme prediction section is the series predictor which uses the coding unit for assigning the morpheme label to the resultant vector generated for each character by the vector combination section. In addition, the morpheme prediction section outputs the morpheme label string as the morphological analysis result of the input text for learning by causing the coding unit to perform input into the series predictor which receives the output of the immediately preceding coding unit as the input, sequentially performing the calculation according to Formula (4) described above, and sequentially selecting the morpheme label according to Formula (7)

The parameter learning section 78 performs the learning of the parameter of the series predictor according to Formula (11) described above such that the morpheme label string obtained by the analysis section 76 coincides with the morpheme label string of the learning data. Note that, in the following case, the learning of the parameter of the series predictor is performed according to Formula (13) described above. The case where the vector combination section of the analysis section 76 generates the resultant vector such that the case where the resultant vector in which the character vector and the morpheme information vector are combined is generated and the case where the resultant vector is generated without being combined with the morpheme information vector are equally used.

The processing in each of the sampling section 72, the division section 74, the analysis section 76, and the parameter learning section 78 is repeated until the end condition is satisfied.

<Operation of Morphological Analysis Learning Apparatus According to Embodiment of Present Invention>

Next, a description will be given of the operation of the morphological analysis learning apparatus 150 according to the embodiment of the present invention. When N pieces of the learning data are received in the input section 60, the morphological analysis learning apparatus 150 executes the morphological analysis learning processing routine shown in FIG. 4.

First, in Step S100, one of N pieces of the learning data received in the input section 60 is acquired.

In Step S102, the morphological analysis is performed on the input text for learning of the learning data acquired in Step S100 described above.

Figure 5:
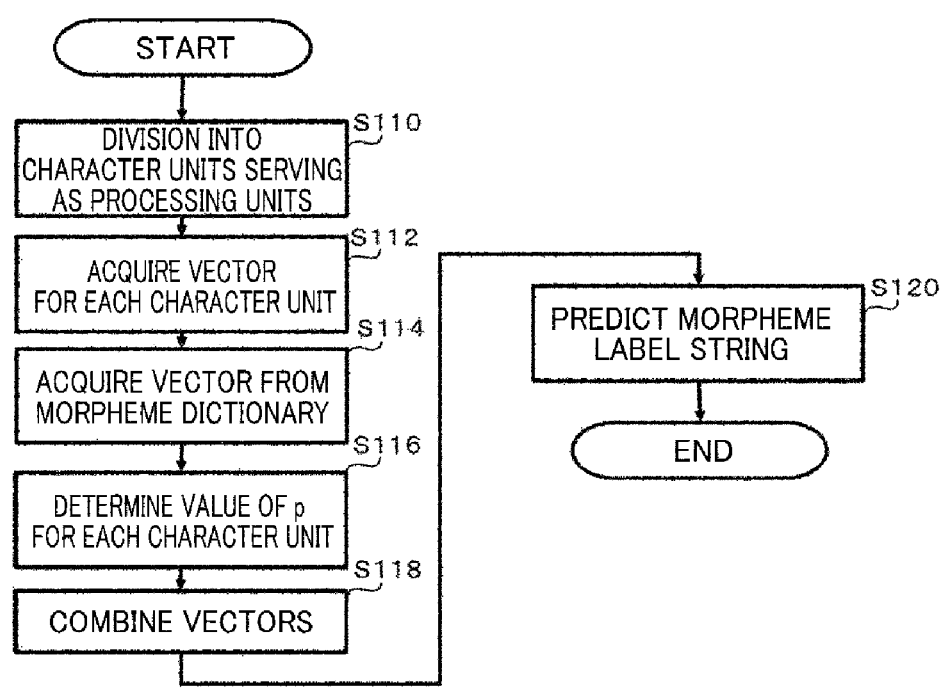
FIG. 5 is a flowchart showing a processing routine for performing morphological analysis in the morphological analysis learning apparatus according to the embodiment of the present invention.

Step S102 is implemented by a processing routine shown in FIG. 5.

In Step S110, the input text for learning of the learning data acquired in Step S100 described above is divided into character units.

In Step S112, the character vector is acquired from the character vector storage section for each character of the input text for learning, and the list of the character vectors is outputted.

In Step S114, the dictionary vector acquisition section operates in the following manner. The dictionary vector acquisition section acquires, for each character substring of the input text for learning, the entry of the morpheme information matching the character substring from the morpheme dictionary, and acquires the vector representing the morpheme information corresponding to the acquired entry from the morpheme vector storage section. Subsequently, the dictionary vector acquisition section determines, for each character of the input text for learning, the morpheme vector to which the vector corresponding to the entry of the morpheme information matching the character substring including the character is added, and outputs the list of the morpheme vectors.

In Step S116, by determining p for each character of the input text for learning according to Formula (12) described above, it is randomly determined whether the resultant vector in which the character vector and the morpheme information vector are combined is generated or the resultant vector is generated without being combined with the morpheme information vector.

In Step S118, the resultant vector in which the character vector and the morpheme information vector are combined is generated for each character of the input text for learning according to Formula (3) described above, and the list of the resultant vectors is outputted.

In Step S120, the morpheme prediction section operates in the following manner. The morpheme prediction section operates as the series predictor which uses the coding unit for assigning the morpheme label to the resultant vector generated for each character. In addition, the morpheme prediction section outputs the morpheme label string as the morphological analysis result of the input text for learning by causing the coding unit to perform input into the series predictor which receives the output of the immediately preceding coding unit as the input, sequentially performing the calculation according to Formula (4) described above, and sequentially selecting the morpheme label according to Formula (7) described above.

Figure 4:
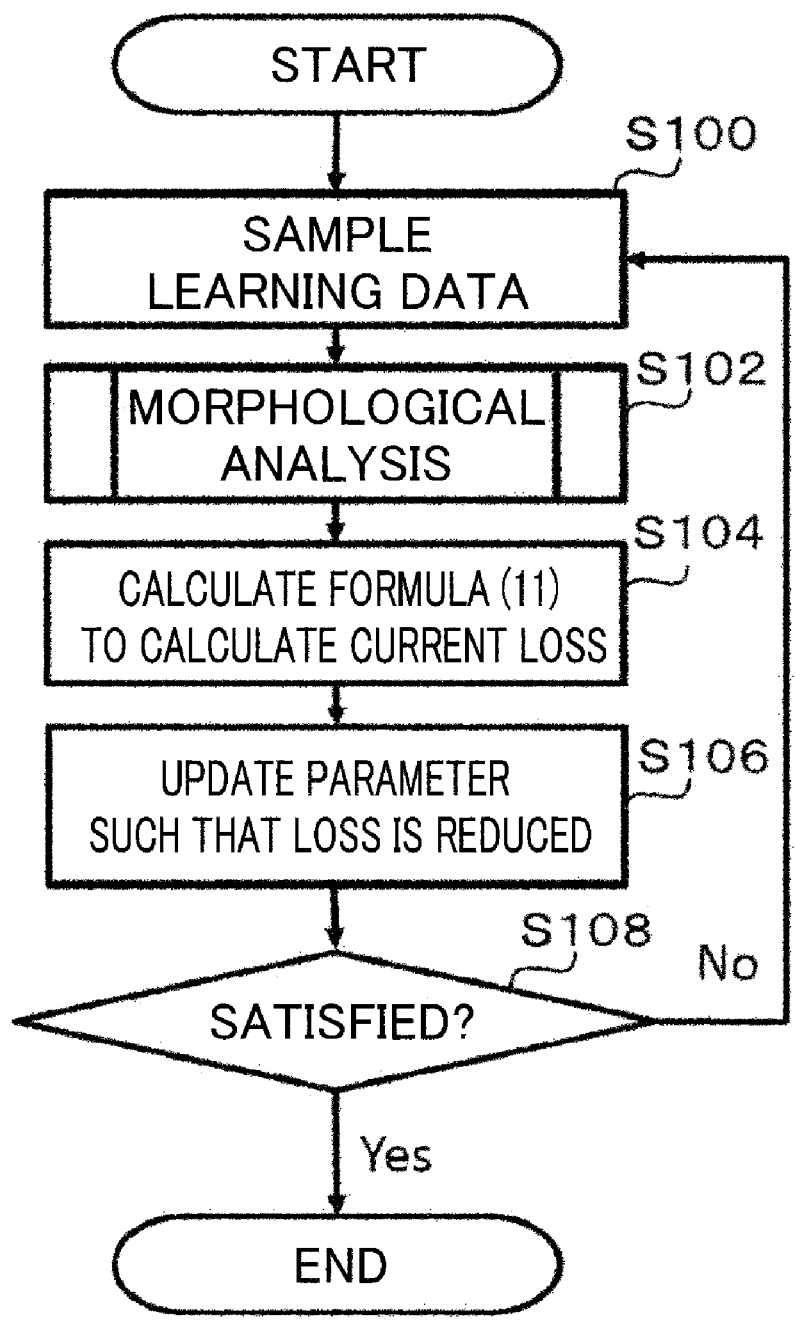
FIG. 4 is a flowchart showing a morphological analysis learning processing routine in the morphological analysis learning apparatus according to the embodiment of the present invention.

Subsequently, in Step S104 in FIG. 4 described above, the loss is calculated according to Formula (11) described above based on the morpheme label string obtained in Step S120 described above and the morpheme label string of the learning data.

In Step S106, the parameter of the series predictor is updated such that the loss calculated in Step S104 described above is reduced.

In Step S108, it is determined whether or not the end condition is satisfied and, in the case where the end condition is not satisfied, the morphological analysis learning processing routine returns to Step S100 described above. On the other hand, in the case where the end condition is satisfied, the morphological analysis learning processing routine is ended.

<Operation of Morphological Analysis Apparatus According to Embodiment of Present Invention>

Figure 6:
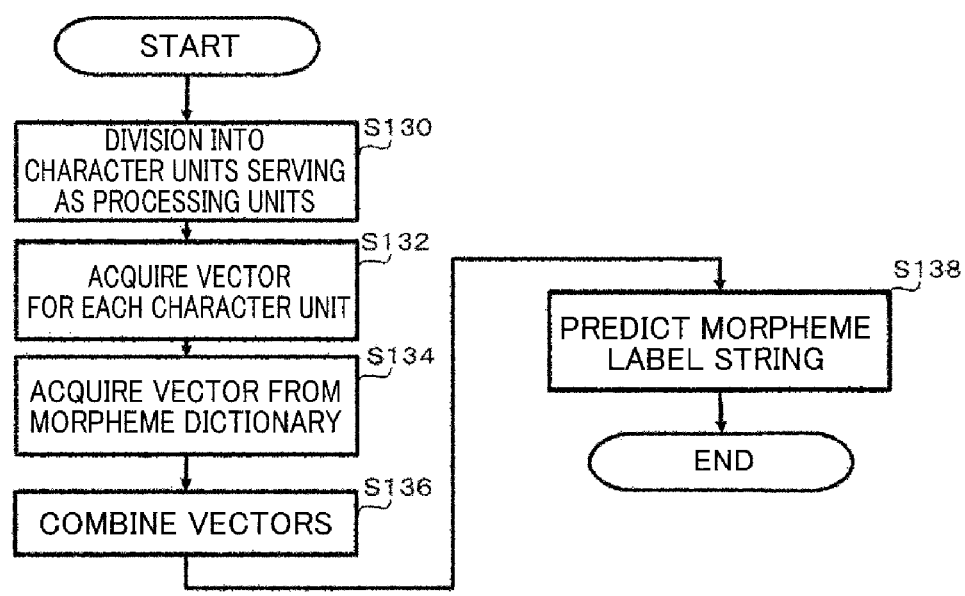
FIG. 6 is a flowchart showing the morphological analysis learning processing routine in the morphological analysis apparatus according to the embodiment of the present invention.
Figure 7:
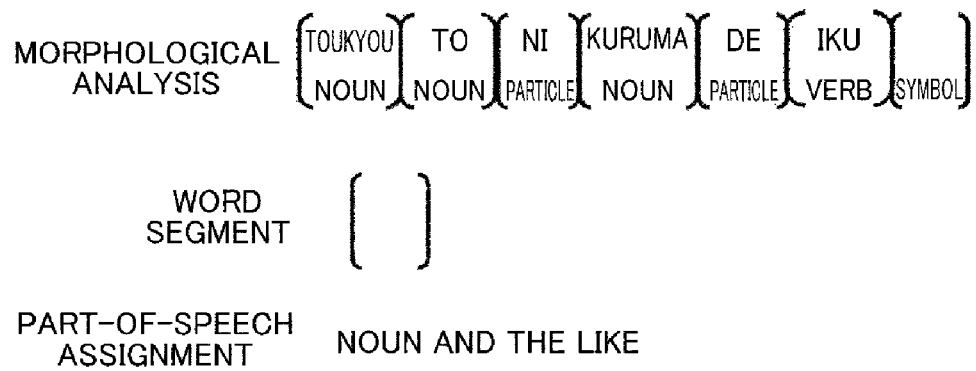
FIG. 7 is a view showing an example of morphological analysis.
Figure 8:
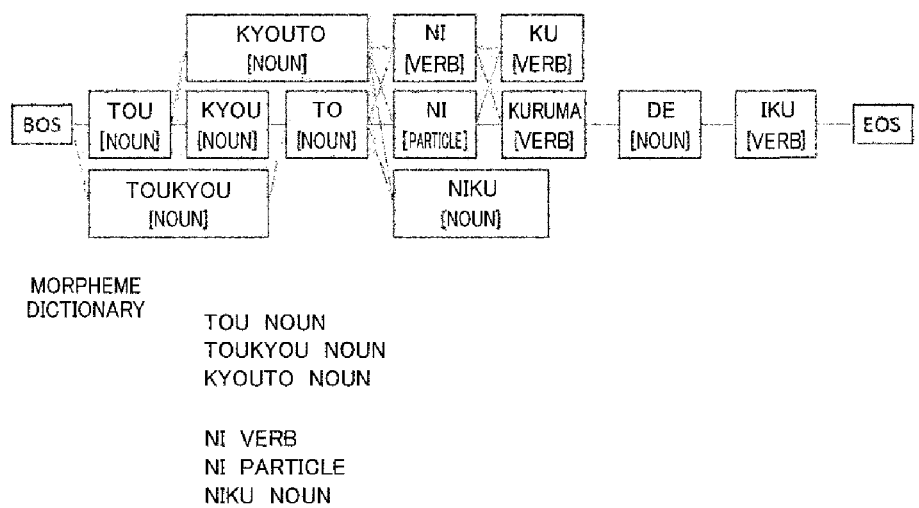
FIG. 8 is a view showing an example of a problem of selection of an optimum morpheme string.
Figure 9:
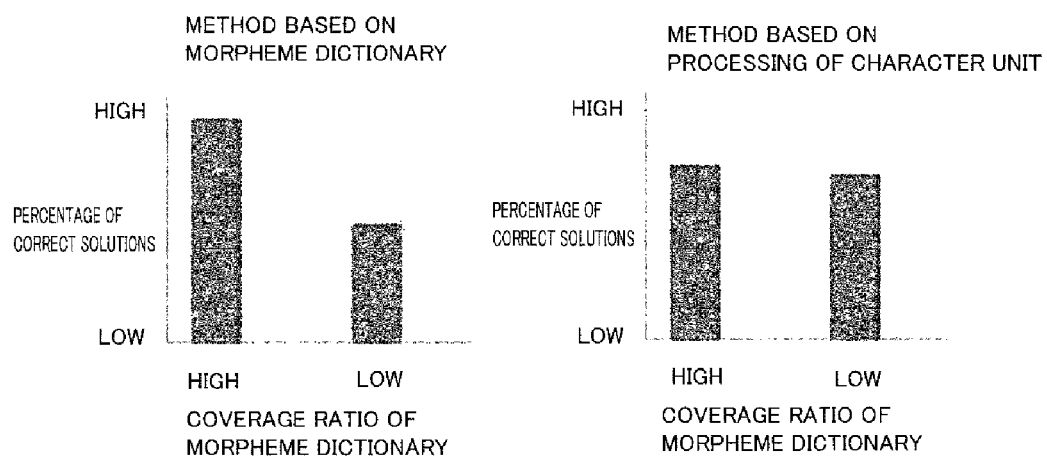
FIG. 9 is a graph showing the percentage of correct solutions corresponding to a coverage ratio of a morpheme dictionary.

Next, a description will be given of the operation of the morphological analysis apparatus 100 according to the embodiment of the present invention. First, the parameter of the series predictor subjected to the learning by the morphological analysis learning apparatus 150 is set in the morphological analysis apparatus 100. Subsequently, when the input text is received in the input section 10, the morphological analysis apparatus 100 executes the morphological analysis processing routine shown in FIG. 6.

First, in Step S130, the input text received in the input section 10 is divided into character units.

In Step S132, the character vector is acquired from the character vector storage section 26 for each character of the input text, and the list of the character vectors is outputted.

In Step S134, the dictionary vector acquisition section 34 operates in the following manner. The dictionary vector acquisition section 34 acquires, for each character substring of the input text, the entry of the morpheme information matching the character substring from the morpheme dictionary 30, and acquires the vector representing the morpheme information corresponding to the acquired entry from the morpheme vector storage section 32. Further, the dictionary vector acquisition section 34 determines, for each character of the input text, the morpheme vector to which the vector corresponding to the entry of the morpheme information matching the character substring including the character is added, and outputs the list of the morpheme vectors.

In Step S136, the resultant vector in which the character vector and the morpheme information vector are combined is generated for each character of the input text according to Formula (3) described above, and the list of the resultant vectors is outputted.

In Step S138, the morpheme prediction section 38 operates in the following manner. The morpheme prediction section 38 operates as the series predictor which uses the coding unit for assigning the morpheme label to the resultant vector generated for each character by the vector combination section. In addition, the morpheme prediction section 38 outputs the morpheme label string as the morphological analysis result of the input text from the output section 50 by causing the coding unit to perform input into the series predictor which receives the output of the immediately preceding coding unit as the input, sequentially performing the calculation according to Formula (4) described above, and sequentially selecting the morpheme label according to Formula (7) described above, and the morphological analysis processing routine is ended.

As described thus far, according to the morphological analysis learning apparatus of the embodiment of the present invention, by performing the learning of the parameter of the series predictor such that the morpheme label string obtained by inputting the resultant vector in which the character vector and the morpheme information vector are combined and which is generated without being combined with the morpheme information vector with a specific probability into the series predictor and sequentially performing the calculation coincides with the morpheme label string of the learning data, it is possible to perform the learning of the series predictor capable of achieving high analysis accuracy on the whole irrespective of the coverage ratio of the morpheme dictionary.

In addition, by artificially creating the situation in the case where the coverage ratio of the morpheme dictionary is high and the situation in the case where the coverage ratio of the morpheme dictionary is low and performing the learning of the morphological analyzer, it becomes possible to achieve high analysis accuracy irrespective of the coverage ratio of the morpheme dictionary. Further, in the case where the coverage ratio of the morpheme dictionary is high, it is possible to maintain analysis accuracy equal to that of the conventional method and, even in the case where the coverage ratio is low, it is possible to significantly reduce degradation of the analysis accuracy.

In addition, according to the morphological analysis apparatus of the embodiment of the present invention, by using the series predictor subjected to the learning in advance such that the morpheme label string obtained by inputting the resultant vector in which the character vector and the morpheme information vector are combined and which is generated without being combined with the morpheme information vector with a specific probability into the series predictor and sequentially performing the calculation coincides with the morpheme label string of the learning data, it is possible to achieve high analysis accuracy on the whole irrespective of the coverage ratio of the morpheme dictionary.

Further, in the embodiment of the present invention, a main object is to improve a problem of a tradeoff of analysis accuracy with respect to unknown words described herein, and it is possible to achieve high analysis accuracy on the whole even in the situation of any coverage ratio of the morpheme dictionary.

Note that the present invention is not limited to the above-described embodiment, and various modifications and applications may be made without departing from the gist of the invention.

For example, while the morphological analysis learning apparatus and the morphological analysis apparatus are configured as apparatuses which are separated from each other in the above-described embodiment, the morphological analysis learning apparatus and the morphological analysis apparatus may be configured as one apparatus.

In addition, while each of the morphological analysis learning apparatus and the morphological analysis apparatus described above has the computer system in the apparatus, in the case where a WWW system is used, the "computer system" includes homepage provision environment (or display environment).

Further, while the embodiment is described as the embodiment in which programs are preinstalled in the description of the present application, it is also possible to store the programs in a computer-readable recording medium and provide the programs.

REFERENCE SIGNS LIST

10 Input section
20 Computation section
22 Division section
24 Analysis section
26 Character vector storage section
28 Character vector acquisition section
30 Morpheme dictionary
32 Morpheme vector storage section
34 Dictionary vector acquisition section
36 Vector combination section
38 Morpheme prediction section
50 Output section
60 Input section
70 Computation section
72 Sampling section
74 Division section
76 Analysis section
78 Parameter learning section
100 Morphological analysis apparatus
150 Morphological analysis learning apparatus

The invention claimed is:

1. A computer-implemented method for processing natural language input, the method comprising:
receiving learning data, wherein the learning data includes a pair of input text and a morpheme label string as a morphological analysis result of the input text for learning, and wherein the morpheme label string includes a series of morpheme labels;
generating a series of characters based on the received input text;
generating a series of character vectors, wherein each character vector of the series of character vectors is a vector form of each character of the series of characters;
generating morpheme information for each of character sub strings of the text input, wherein each of the character strings comprises one or more characters of the series of characters, and wherein each of the morpheme information matches each of the character substring based on a morpheme dictionary;
generating a morpheme vector for each of the character substrings, the morpheme vector representing the generated morpheme information in a vector form;
determining, based on a probability value, whether to generate a plurality of resultant vectors based on a combination of one character vector of the series of character vectors and the morpheme information vector or to generate the plurality of resultant vectors without the morpheme information vector;
generating, based on the determination of generating the plurality of resultant vectors, the plurality of resultant vectors, each of the plurality of resultant vectors is based on either one of:
the combination of the character vector of the series of character vectors and the morpheme information vector corresponding to each character, or the one character vector of the series of character vectors corresponding to each character without combining the morpheme information vector;
specifying a morpheme label to each of the plurality of resultant vectors; and
for each character in sequence in the input text, recursively training a parameter learning model for predicting a series of morpheme labels of the input text using the specified morpheme label to each of the plurality of resultant vectors.

2. The computer-implemented method of claim 1, wherein the parameter learning model is based on a neural network with long short term memory (LSTM), and output of coding operation for assigning a first morpheme label for a first character is input of the coding operation for assigning a second morpheme label for a subsequent character.

3. The computer-implemented method of claim 1, the method further comprising:
determining, at random, whether generating the plurality of resultant vectors based on the combination of the character vector and the morpheme information vector or generating the plurality of resultant vectors without the morpheme information vector.

4. The computer-implemented method of claim 1, wherein a first number of the resultant vectors based on the combination of the morpheme information vector and the character vector and a second number of the resultant vectors based on the character vector without the morpheme information vector are equal.

5. The computer-implemented method of claim 1, the method further comprising:
based on a predetermined probability, generating one or more of the plurality of resultant vectors using the character vector for each of one or more characters without combining the morpheme information vector.

6. The computer-implemented method of claim 1, the method further comprising:
generating a first set of resultant vectors, each of the plurality of resultant vector according to a first probability of generating the resultant vectors without combining the morpheme information vectors;
generating a second set of resultant vectors, each of the plurality of resultant vector according to a second probability of generating the resultant vectors without combining the morpheme information vectors, wherein the first probability and the second probability are distinct; and generating the plurality of resultant vectors based on the first set of resultant vectors and the second set of resultant vectors.

7. The computer-implemented method of claim 1, the method comprising:
when the morpheme dictionary contains no matching morpheme information based on a character substring, predicting, using the trained parameter learning model, a morpheme label for the character sub string; and
providing the series of morpheme labels associated with the input text.

8. A system for machine learning, the system comprises:
a processor; and
a memory storing computer-executable instructions that when executed by the processor cause the system to:
receive learning data, wherein the learning data includes a pair of input text and a morpheme label string as a morphological analysis result of the input text for learning, and wherein the morpheme label string includes a series of morpheme labels;
generate a series of characters based on the received input text;
generate a series of character vectors, wherein each character vector of the series of character vectors is a vector form of each character of the series of characters;
generate morpheme information for each of character sub strings of the text input, wherein each of the character strings comprises one or more characters of the series of characters, and wherein each of the morpheme information matches each of the character substring based on a morpheme dictionary;
generate a morpheme vector for each of the character substrings, the morpheme vector representing the generated morpheme information in a vector form;
determine, based on a probability value, whether to generate a plurality of resultant vectors based on a combination of one character vector of the series of character vectors and the morpheme information vector or to generate the plurality of resultant vectors without the morpheme information vector;
generate, based on the determination of generating the plurality of resultant vectors, a plurality of resultant vectors, each of the plurality of resultant vectors is based on either one of:
the combination of the character vector of the series of character vectors and the morpheme information vector corresponding to each character, or
the one character vector of the series of character corresponding to each character without combining the morpheme information vector;
specify a morpheme label to each of the plurality of resultant vectors; and
for each character in sequence in the input text, recursively train a parameter learning model for predicting a series of morpheme labels of the input text using the specified morpheme label to each of the plurality of resultant vectors.

9. The system of claim 8, wherein the parameter learning model is based on a neural network with long short term memory (LSTM), and output of coding operation for assigning a first morpheme label for a first character is input of the coding operation for assigning a second morpheme label for a subsequent character.

10. The system of claim 8, the computer-executable instructions when executed further causing the system to:

determine, at random, whether generating the plurality of resultant vectors based on the combination of the character vector and the morpheme information vector or generating the plurality of resultant vectors without the morpheme information vector.

11. The system of claim 8, wherein a first number of the resultant vectors based on the combination of the morpheme information vector and the character vector and a second number of the resultant vectors based on the character vector without the morpheme information vector are equal.

12. The system of claim 8, the computer-executable instructions when executed further causing the system to:
based on a predetermined probability, generate one or more of the plurality of resultant vectors using the character vector for each of one or more characters without combining the morpheme information vector.

13. The system of claim 8, the computer-executable instructions when executed further causing the system to:
generate a first set of resultant vectors, each of the plurality of resultant vector according to a first probability of generating the resultant vectors without combining the morpheme information vectors;
generate a second set of resultant vectors, each of the plurality of resultant vector according to a second probability of generating the resultant vectors without combining the morpheme information vectors, wherein the first probability and the second probability are distinct; and
generate the plurality of resultant vectors based on the first set of resultant vectors and the second set of resultant vectors.

14. The system of claim 8, the computer-executable instructions when executed further causing the system to:
when the morpheme dictionary contains no matching morpheme information based on a character substring, predict, using the trained parameter learning model, a morpheme label for the character sub string; and
provide the series of morpheme labels associated with the input text.

15. A computer-readable non-transitory recording medium storing computer-executable instructions that when executed by a processor cause a computer system to:
receive learning data, wherein the learning data includes a pair of input text and a morpheme label string as a morphological analysis result of the input text for learning, and wherein the morpheme label string includes a series of morpheme labels;
generate a series of characters based on the received input text;
generate a series of character vectors, wherein each character vector of the series of character vectors is a vector form of each character of the series of characters;
generate morpheme information for each of character sub strings of the text input, wherein each of the character strings comprises one or more characters of the series of characters, and wherein each of the morpheme information matches each of the character substring based on a morpheme dictionary;
generate a morpheme vector for each of the character substrings, the morpheme vector representing the generated morpheme information in a vector form;
determine, based on a probability value, whether to generate a plurality of resultant vectors based on a combination of one character vector of the series of character vectors and the morpheme information vector or to generate the plurality of resultant vectors without the morpheme information vector;

generate, based on the determination of generating the plurality of resultant vectors, a plurality of resultant vectors, each of the plurality of resultant vectors is based on either one of:
the combination of the character vector of the series of character vectors and the morpheme information vector corresponding to each character, or
the one character vector of the series of character corresponding to each character without combining the morpheme information vector;
specify a morpheme label to each of the plurality of resultant vectors; and
for each character in sequence in the input text, recursively train a parameter learning model for predicting a series of morpheme labels of the input text using the specified morpheme label to each of the plurality of resultant vectors.

16. The computer-readable non-transitory recording medium of claim 15, wherein the parameter learning model is based on a neural network with long short term memory (LSTM), and output of coding operation for assigning a first morpheme label for a first character is input of the coding operation for assigning a second morpheme label for a subsequent character.

17. The computer-readable non-transitory recording medium of claim 15, the computer-executable instructions when executed further causing the system to:
determine, at random, whether generating the plurality of resultant vectors based on the combination of the character vector and the morpheme information vector or generating the plurality of resultant vectors without the morpheme information vector.

18. The computer-readable non-transitory recording medium of claim 15, the computer-executable instructions when executed further causing the system to:
based on a predetermined probability, generate one or more of the plurality of resultant vectors using the character vector for each of one or more characters without combining the morpheme information vector.

19. The computer-readable non-transitory recording medium of claim 15, the computer-executable instructions when executed further causing the system to:
generate a first set of resultant vectors, each of the plurality of resultant vector according to a first probability of generating the resultant vectors without combining the morpheme information vectors;
generate a second set of resultant vectors, each of the plurality of resultant vector according to a second probability of generating the resultant vectors without combining the morpheme information vectors, wherein the first probability and the second probability are distinct; and
generate the plurality of resultant vectors based on the first set of resultant vectors and the second set of resultant vectors.

20. The computer-readable non-transitory recording medium of claim 15, the computer-executable instructions when executed further causing the system to:
when the morpheme dictionary contains no matching morpheme information based on a character substring, predict, using the trained parameter learning model, a morpheme label for the character sub string; and
provide the series of morpheme labels associated with the input text.

* * * * *